United States Patent
Walter

(10) Patent No.: US 12,459,183 B2
(45) Date of Patent: Nov. 4, 2025

(54) EXTRUSION HEAD ARRANGEMENT

(71) Applicant: W. Müller GmbH, Troisdorf (DE)

(72) Inventor: Ulrich Walter, Lohmar (DE)

(73) Assignee: W. Müller GmbH, Troisdorf (DE)

( * ) Notice: Subject to any disclaimer, the term of this patent is extended or adjusted under 35 U.S.C. 154(b) by 90 days.

(21) Appl. No.: 18/631,834

(22) Filed: Apr. 10, 2024

(65) Prior Publication Data

US 2024/0253289 A1    Aug. 1, 2024

Related U.S. Application Data

(63) Continuation of application No. PCT/EP2022/073168, filed on Aug. 19, 2022.

(30) Foreign Application Priority Data

Oct. 11, 2021  (EP) .................................. 21201863

(51) Int. Cl.
  *B29C 48/345* (2019.01)
  *B29C 48/335* (2019.01)
  *B29C 48/86* (2019.01)

(52) U.S. Cl.
  CPC .......... *B29C 48/345* (2019.02); *B29C 48/335* (2019.02); *B29C 48/865* (2019.02)

(58) Field of Classification Search
  CPC ... B29C 48/345; B29C 48/335; B29C 48/865; B29C 49/04102; B29C 2949/0764; B29C 48/0255; B29C 48/09; B29C 48/327; B29C 49/04; B29C 49/04108; B29C 49/071; B29C 48/0017
  See application file for complete search history.

(56) References Cited

U.S. PATENT DOCUMENTS

| | | | |
|---|---|---|---|
| 4,179,251 A * | 12/1979 | Hess | B29C 48/335 425/467 |
| 4,772,197 A * | 9/1988 | Heck | B29C 48/2566 425/204 |
| 9,138,930 B2 * | 9/2015 | Kunz | B29C 48/09 |

(Continued)

FOREIGN PATENT DOCUMENTS

| | | |
|---|---|---|
| DE | 102007030677 | 5/2009 |
| WO | 2021023663 | 2/2021 |

OTHER PUBLICATIONS

International Search Report for international application PCT/EP2022/073168, mailed Dec. 15, 2022.

*Primary Examiner* — Nahida Sultana
(74) *Attorney, Agent, or Firm* — Burris Law, PLLC

(57) ABSTRACT

An extrusion head arrangement has a plurality of extrusion heads arranged next to one another along a transverse axis. Each extrusion head has a housing with at least one flow channel for forming a strand of extrudable plastic in the direction of a longitudinal axis. The housing has an outer housing part extending along the longitudinal axis with an outer circumferential surface. A longitudinal bore parallel to the longitudinal axis is arranged in the outer housing part. The outer circumferential surface of the outer housing part has an oval cross-section with a largest diameter and a smallest diameter. The extrusion heads are arranged next to each other with the smallest diameters parallel to the transverse axis. The longitudinal bores are each arranged on a diameter deviating from the smallest diameter.

6 Claims, 3 Drawing Sheets

(56) References Cited

U.S. PATENT DOCUMENTS

| | | |
|---|---|---|
| 9,527,225 B2 * | 12/2016 | Tardy ................ B29C 49/04112 |
| 2009/0011062 A1 | 1/2009 | Walter |
| 2014/0271962 A1 | 9/2014 | Rogaczewski |
| 2022/0288832 A1 | 9/2022 | Mielke et al. |
| 2024/0100760 A1 * | 3/2024 | Mielke ................ B29C 48/0255 |

* cited by examiner

EXTRUSION HEAD ARRANGEMENT

CROSS-REFERENCE TO RELATED APPLICATIONS

This application is a continuation of International Application No. PCT/EP2022/073168, filed on Aug. 19, 2022, which claims priority to and the benefit of EP 21201863.4, filed on Oct. 11, 2021. The disclosures of the above applications are incorporated herein by reference.

FIELD

The present disclosure relates to an extrusion head arrangement.

BACKGROUND

The statements in this section merely provide background information related to the present disclosure and may not constitute prior art.

An extrusion head arrangement may include a plurality of extrusion heads arranged next to one another along a transverse axis. Each extrusion head has a housing with at least one flow channel for forming a strand of extrudable plastic in the direction of a longitudinal axis. The housing has an outer housing part extending along the longitudinal axis with an outer circumferential surface, whereby a longitudinal bore is arranged in the outer housing part parallel to the longitudinal axis.

Such an extrusion head arrangement is known from DE 10 2007 030 677 B4. The outer circumferential surfaces of the outer housing parts each have a circular cross-section. The outer housing parts also each have a central bore coaxial to the longitudinal axis, which also have a circular cross-section and are used to accommodate inner housing parts and/or a central mandrel. The flow channel for forming a strand of extrudable plastic is formed between an inner circumferential surface, which forms the central bore, of the respective outer housing part and an outer circumferential surface of the inner housing part inserted therein or the inserted mandrel. The longitudinal bores parallel to the longitudinal axis are used, for example, as an inlet for extrudable material to the flow channel or as a return from it. In addition, the longitudinal hole can also take on other functions, such as a hole for holding a clamping rod or similar.

The wall thickness of the outer housing part must be dimensioned so that the longitudinal bore can be arranged in it and the outer housing part is not weakened too much in the area of the longitudinal bore in order to avoid instability. The diameters of the elements inserted into the outer housing part, such as the inner housing part and/or mandrel, also result from the required strengths.

The distance between two neighboring extrusion heads respectively the longitudinal axes of two neighboring extrusion heads is therefore primarily dependent on the wall thickness of the outer housing part. The wall thickness of the outer housing part is in turn dependent on the diameter of the longitudinal bore and the required stability of the outer housing part in the area of the longitudinal bore. This means that the wall thickness of the outer housing part is oversized for the other circumferential areas in which no longitudinal bore is provided.

SUMMARY

This section provides a general summary of the disclosure and is not a comprehensive disclosure of its full scope or all of its features.

An object of the present disclosure is to reduce the distance between two extrusion heads arranged next to each other.

The object is achieved by an extrusion head arrangement having a plurality of extrusion heads arranged next to one another along a transverse axis, each extrusion head having a housing with at least one flow channel for forming a strand of extrudable plastic in the direction of a longitudinal axis. The housing has an outer housing part extending along the longitudinal axis with an outer circumferential surface, whereby a longitudinal bore is arranged in the outer housing part parallel to the longitudinal axis. The outer circumferential surfaces of the outer housing parts each have an oval cross-section with a largest diameter and a smallest diameter. The extrusion heads are arranged next to each other with the smallest diameters parallel to the transverse axis. The longitudinal bores are each arranged on a diameter deviating from the smallest diameter.

Due to the oval design of the outer circumferential surface, the longitudinal bore can be arranged in an area away from the smallest diameter. This allows the wall thickness in the area of the smallest diameter to be adapted to the minimum wall thickness required to maintain the necessary stability. The longitudinal bore can be provided in an area of larger wall thickness. Since the extrusion heads are arranged next to each other along the smallest diameters, the distance between two neighboring extrusion heads can be reduced compared to the state of the art.

The longitudinal bores can each be arranged on a diameter that forms a smaller angle with the largest diameter than with the smallest diameter. This ensures that the longitudinal bore is located in an area of greater wall thickness. In extreme cases, the longitudinal bore can be arranged on the largest diameter.

In one embodiment, it may be provided that the longitudinal bores each have a diameter that is greater than or equal to the wall thickness of the outer housing part in the area of the smallest diameter. In this design example, an arrangement of the longitudinal bore in the area of the smallest diameter would not be possible at all due to the small wall thickness and must therefore be arranged in the area of the larger wall thicknesses.

The outer housing parts can each have a central bore with a circular cross-section, which can serve to accommodate an inner housing part and/or a central mandrel, the flow channel for forming a strand of extrudable plastic being formed between these elements and an inner circumferential surface of the outer housing parts.

The outer housing part can also accommodate several inner housing parts and/or a mandrel, depending on how many layers the strand of extrudable plastic is to be made from.

A heating element can be arranged around each of the outer housing parts, which rests against the outer circumferential surface. Thanks to the oval and thus rounded cross-sectional shape of the outer circumferential surfaces, heating elements can be easily clamped onto the respective outer circumferential surface without creating air gaps between the heating elements and the outer housing parts. In addition, the oval cross-sectional shape ensures a homogeneous heat input into the housing and into the at least one flow channel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
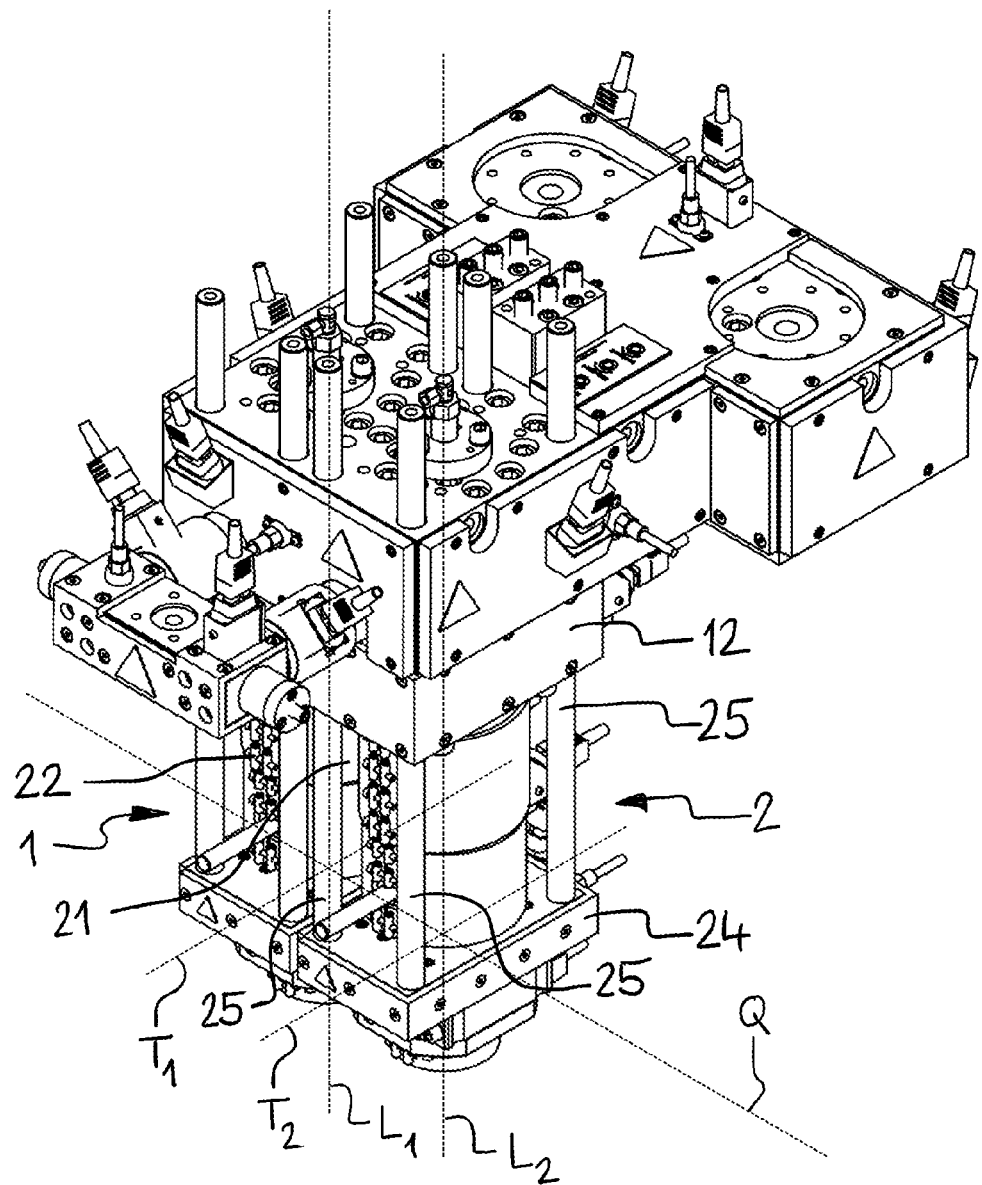
FIG. 1 is a perspective view of an extrusion head arrangement of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
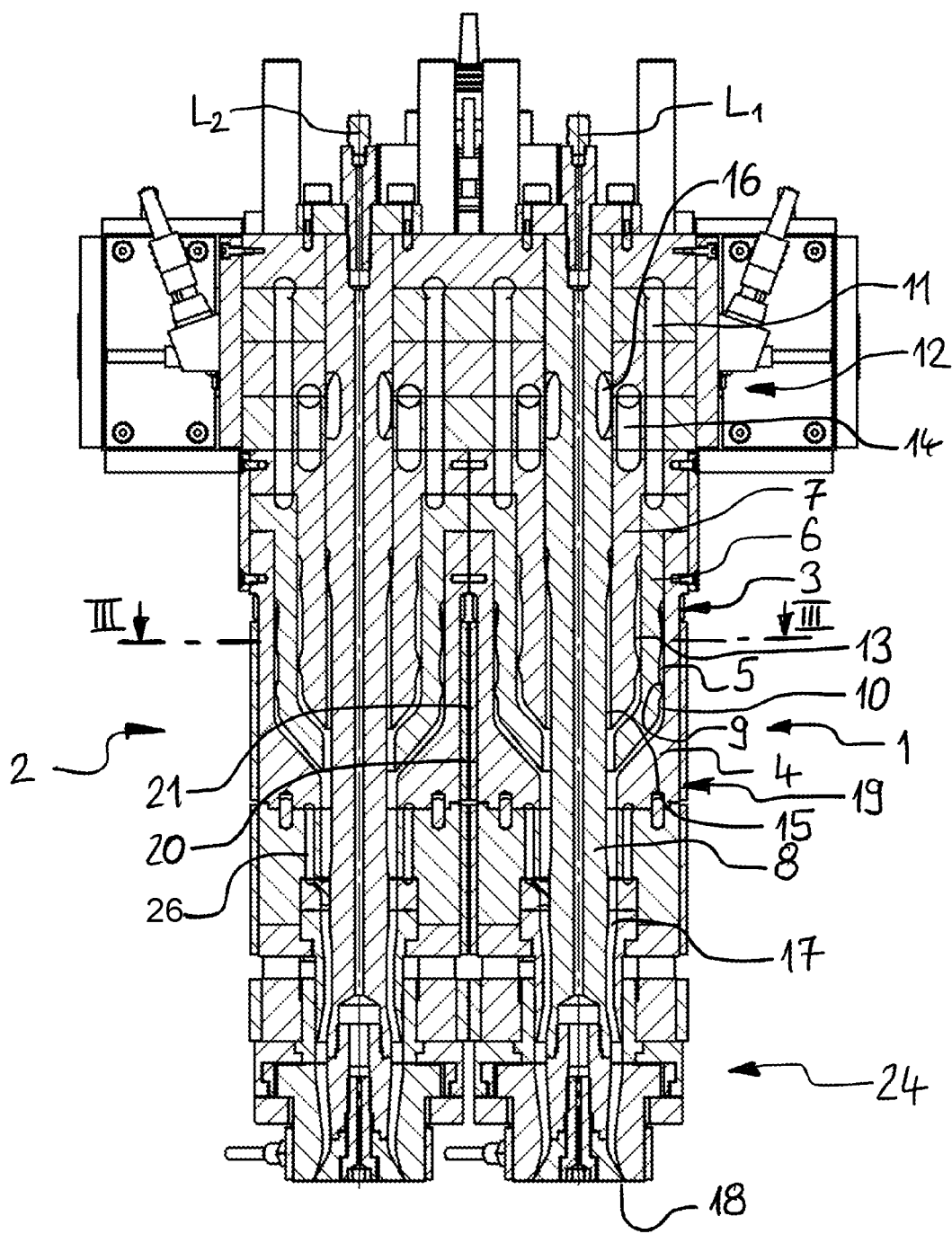
FIG. 2 is a cross-sectional view of the extrusion head arrangement of FIG. 1 through both extrusion heads.
Figure 3:
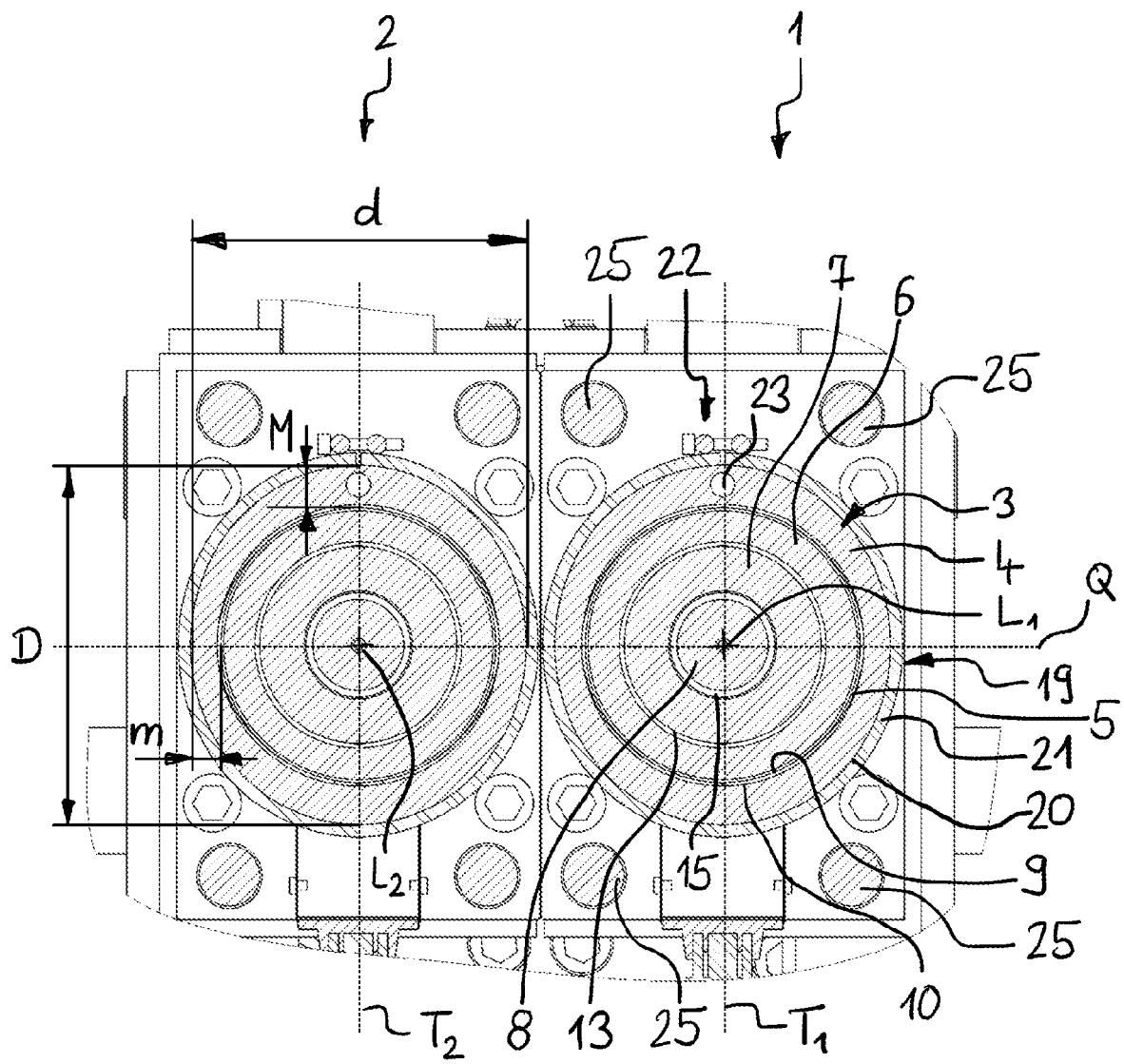
FIG. 3 is a cross-sectional view of the extrusion head arrangement, taken along line III-III of FIG. 2.

FIGS. 1 to 3 show an embodiment of an extrusion head arrangement in different representations, whereby FIGS. 1 to 3 are described together below.

The extrusion head arrangement comprises a first extrusion head 1 and a second extrusion head 2, which are arranged next to each other along a transverse axis Q. The first extrusion head 1 extends essentially along a first longitudinal axis $L_1$ and the second extrusion head 2 along a second longitudinal axis $L_2$. In the following, the first extrusion head 1 is explained in more detail as representative of both extrusion heads 1, 2.

The first extrusion head 1 has a housing 3 in which an outer flow channel 5 is arranged coaxially to the first longitudinal axis $L_1$. For this purpose, the housing 3 has an outer housing part 4 that accommodates a first inner housing part 6, a second inner housing part 7 and a central mandrel 8. The outer housing part 4, the first inner housing part 6, the second inner housing part 7 and the central mandrel 8 are arranged coaxially to the first longitudinal axis $L_1$.

The outer housing part 4 has a central bore 9 into which the first inner housing part 6 is inserted. The outer flow channel 5 in the form of an annular channel is formed between an outer circumferential surface 10 of the first inner housing part 6 and an inner surface formed by the central bore 9 of the outer housing part 4. The outer flow channel 5 is fed with plasticizable plastic by connecting channels 11 of a manifold 12, the connecting channels 11 being connected to a first extruder not shown here.

In the same way, the first housing inner part 6 accommodates the second housing inner part 7, a central flow channel 13 being formed between the first housing inner part 6 and the second housing inner part 7, which is fed by connection channels 14 of the manifold 12 and is connected to a second extruder, not shown here.

Finally, the second inner housing part 7 accommodates the mandrel 8, an inner flow channel 15 being formed between the second inner housing part 7 and the mandrel 8, which is connected to a third extruder, not shown here, via connection channels 16 of the manifold 12 for the supply of plasticizable plastic.

The outer flow channel 5, the central flow channel 13 and the inner flow channel 15 open into a common flow channel 17, which leads to an annular gap nozzle 18, from which a tube made of extrudable plastic finally emerges. The central mandrel 8 can be adjusted along the first longitudinal axis $L_1$, allowing the annular gap nozzle 18 to be opened and closed. The outer flow channel 5 is used to form an outer layer, the middle flow channel 13 to form a middle layer and the inner flow channel 15 to form an inner layer of the hose.

In principle, it is also conceivable that only one flow channel is provided or a number of flow channels that differs from the three flow channels 5, 13, 15 shown.

As is known to those skilled in the art, the plastic material is plasticized in the aforementioned extruders by heating and kneading before it is fed to the extrusion heads 1, 2. In order to maintain the plasticized state of the plastic material, a heating arrangement 19 is arranged around the housing 3, in particular around the outer housing part 4, which is in contact with an outer circumferential surface 20 of the outer housing part 4. The heating arrangement 19 comprises a heating element 21, which is arranged around the outer housing part 4 in contact with the outer circumferential surface 20 and is braced against the latter by means of a clamping arrangement 22.

A longitudinal bore 23 is arranged in the outer housing part 4, which runs parallel to the first longitudinal axis $L_1$. A feed channel 26 for an outer coating of the hose to be extruded is fed via the longitudinal bore 23.

The outer circumferential surface 20 of the outer housing part 4 is oval in shape with a smallest diameter d in the direction of the transverse axis Q and a largest diameter D in the direction of a first depth axis $T_1$, which is arranged at right angles to the transverse axis Q. In FIG. 3, the smallest diameter d and the largest diameter D are shown on the second extrusion head 2 for the sake of clarity, whereby it should be noted that the first extrusion head 1 is designed identically to the second extrusion head 2.

The central bore 9 of the outer housing part 4 is circular-cylindrical in shape, with the central bore 9 and the outer circumferential surface 20 being arranged coaxially to the first longitudinal axis $L_1$. This results in a larger wall thickness M of the outer housing part 4 in the direction of the first depth axis $T_1$ than in the direction of the transverse axis Q with a smaller wall thickness m. The wall thickness m in the direction of the transverse axis Q can be selected in such a way that it is adapted to the minimum stability requirements for the outer housing part 4. In the area of the longitudinal bore 23, a larger wall thickness M is required to maintain stability, which is achieved by the oval outer circumferential surface 20 having the largest diameter D in this direction. This means that the longitudinal bore 23 can be accommodated in this area without any loss of stability. In the present embodiment example, the longitudinal bore 23 has a diameter that corresponds approximately to the smaller wall thickness m.

It is also conceivable that the longitudinal bore 23 is not arranged directly on the first depth axis $T_1$, but offset laterally to it in the circumferential direction around the first longitudinal axis $L_1$. However, it should not be arranged in the area of the transverse axis Q, so that a larger wall thickness is not required in this area.

Due to the low wall thickness m in the area of the transverse axis Q, the extrusion heads 1, 2 can be arranged closer together than in the state of the art, in which the outer circumferential surface is circular-cylindrical, so that the high material thickness M is present over the entire circumference.

The outer housing part 4, the first inner housing part 6 and the second inner housing part 7 together form a central housing section extending between the manifold 12 and a nozzle section 24. In cross-section transverse to the first longitudinal axis $L_1$, the central housing section has the outer contour of the outer housing part 4, i.e. it is oval in shape. The manifold 12 and the nozzle section 24 are rectangular in cross-section and partially project radially beyond the outer circumference of the central housing section. For fastening purposes, four clamping rods 25 are arranged distributed around the circumference in relation to the first longitudinal axis $L_1$, which hold the manifold 12 and the nozzle section 24 axially relative to each other and hold the central housing section between them. Due to the oval or round design of the outer contour of the central housing section, the clamping rods 25 can be arranged to overlap with the central housing section when viewed in the direction of the first depth axis $T_1$, so that the clamping rods 25 do not collide with components of an adjacent extrusion head when several extrusion heads 1, 2 are arranged next to one another.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An extrusion head arrangement comprising:
a plurality of extrusion heads arranged next to one another along a transverse axis, each extrusion head having a housing with at least one flow channel for forming a strand of extrudable plastic in the direction of a longitudinal axis, the housing having an outer housing part extending along the longitudinal axis with an outer circumferential surface, a longitudinal bore parallel to the longitudinal axis being arranged in the outer housing part,
wherein the outer circumferential surface of the outer housing part has an oval cross-section with a largest diameter and a smallest diameter, the extrusion heads being arranged next to each other with the smallest diameters parallel to the transverse axis, and the longitudinal bores each being arranged on a diameter deviating from the smallest diameter.

2. The extrusion head arrangement according to claim 1, wherein the longitudinal bores are each arranged on a diameter which forms a smaller angle to the largest diameter than to the smallest diameter.

3. The extrusion head arrangement according to claim 1, wherein the longitudinal bores are each arranged on the largest diameter.

4. The extrusion head arrangement according to claim 1, wherein the longitudinal bores each have a diameter which is greater than or equal to the wall thickness of the outer housing part in the region of the smallest diameter.

5. The extrusion head arrangement according to claim 1, wherein the outer housing parts each have a central bore with a circular cross-section.

6. The extrusion head arrangement according to claim 1, wherein a heating element is arranged around each of the outer housing parts and rests against the outer circumferential surface.

* * * * *